(12) United States Patent
Chang et al.

(10) Patent No.: US 6,735,096 B2
(45) Date of Patent: May 11, 2004

(54) UNINTERRUPTIBLE DC POWER SYSTEM

(75) Inventors: Herlin Chang, Sheng Keng Shiang (TW); Min-Huang Huang, Hsien (TW)

(73) Assignee: DigiPower Manufacturing Inc., Taipei City (TW)

( * ) Notice: Subject to any disclaimer, the term of this patent is extended or adjusted under 35 U.S.C. 154(b) by 310 days.

(21) Appl. No.: 10/041,737

(22) Filed: Jan. 10, 2002

(65) Prior Publication Data

US 2003/0128562 A1 Jul. 10, 2003

(51) Int. Cl.[7] .............................. H02M 5/40; H02J 7/00
(52) U.S. Cl. .......................... 363/37; 320/128; 307/66
(58) Field of Search .......................... 363/37, 34, 39, 363/97; 307/66, 64, 46, 48; 320/128

(56) References Cited

U.S. PATENT DOCUMENTS

| | | | |
|---|---|---|---|
| 4,473,756 A | * | 9/1984 | Brigden et al. ............... 307/66 |
| 4,510,401 A | * | 4/1985 | Legoult ........................ 307/66 |
| 4,516,035 A | * | 5/1985 | Rhoads et al. ................ 307/66 |
| 4,638,176 A | * | 1/1987 | Martinelli .................... 307/64 |
| 5,289,045 A | * | 2/1994 | Lavin et al. .................. 307/64 |

* cited by examiner

Primary Examiner—Rajnikant B. Patel
(74) Attorney, Agent, or Firm—Rosenberg, Klein & Lee

(57) ABSTRACT

Disclosed herein is a DC uninterruptible power system which is composed of a AC voltage and frequency detecting circuit, an AC to DC conversion and charging circuit, a DC voltage conversion circuit, a load detecting circuit, an output voltage detecting circuit, and a control circuit. The UPS of the present invention can minimize the power loss due to one stage conversion so as to improve system efficiency, and maintain a stable output voltage. Beside, a lighting equipment is installed for illuminating surroundings in case the utility voltage becomes abnormal.

4 Claims, 5 Drawing Sheets

UNINTERRUPTIBLE DC POWER SYSTEM

BACKGROUND OF THE INVENTION

1. Field of the Invention

The present invention relates to an uninterruptible DC power system, (DC UPS) and more particularly, to an uninterruptible DC power system to be served as an emergency power source which is capable of effectively reducing the line loss when applied to electric appliances attached with AC/DC switchable power suppliers (SW power).

2. Description of the Prior Art

Utility electric power is relied on by common domestic consumers as their power source for electric appliances. In case of the occurrence of abnormal states such as power outage, an undervoltage, or a over voltage, or an abnormal frequency, the user's loads loose their power supply so that the unterruptible power system (UPS) whose battery unit normally under floating charge state from the utility source takes over the responsibility for an emergency source to supply the emergency power to those user's loads which have lost the utility power supply.

Normally, the power output of a conventional UPS is in the form of AC. The operational principle of an UPS is inputting the AC utility power by way of an AC to DC converter so as to store the DC energy in the UPS by a DC charging circuit, and then supplies the stored DC electric power to the loads by converting back to AC when the utility power is out thereby serving as a stand by power source. Meanwhile, in the aforesaid UPS scheme, the electric power is firstly converted from AC to DC, and then converted back from DC to AC, through repeated conversion of electric power as such, the electrical circuits used for such repeated conversion of power become complicated with increased circuit loss as well.

Therefore, an invention devoting to resolving aforesaid disadvantages of current UPS so as to upgrade the quality of the UPS is definitely necessary. The present inventor has delved into this matter with long time efforts and come to realization of the present invention.

SUMMARY OF THE INVENTION

It is a first object of the present invention to provide a newly developed DC UPS which is capable of reducing electric power loss during conversion so as to improve the efficiency and effectiveness of the system, and start a lighting equipment in case the utility AC voltage becomes abnormal.

It is a second object of the present invention to provide a newly developed DC UPS which is capable of maintaining a stable output voltage without being influenced by the input source.

It is a third object of the present invention to provide a newly developed DC UPS which is capable of performing power conversion by only one stage so as to minimized the complexity of the circuit scheme and also improve environmental conscious effect.

To achieve the aforesaid objects, the DC UPS of the present invention is composed of at least a AC voltage and frequency detecting circuit, an AC to DC conversion and charging circuit, a DC voltage conversion circuit, a load detecting circuit, an output voltage detecting circuit, and a control circuit. It is essentially emphasized that the invention is devoted to reducing the power loss owing to power conversion so as to improve the system efficiency and save energy. Moreover, the DC UPS of the present invention can maintain a stable output voltage, and by means of detecting utility AC voltage, a lighting equipment can be turned on to illuminate surroundings in case the utility supply voltage is found to be abnormal.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENT

The DC UPS provided by the present invention is well applicable to an electrical appliance using the SW power as its power supplier so as to reduce circuit loss due to power conversion and improve system efficiency and saving energy by only one stage conversion.

Except the complexity in the circuit design is minimized, the invention further contributes to environmental security protection and maintaining a stable output voltage.

Figure 1:
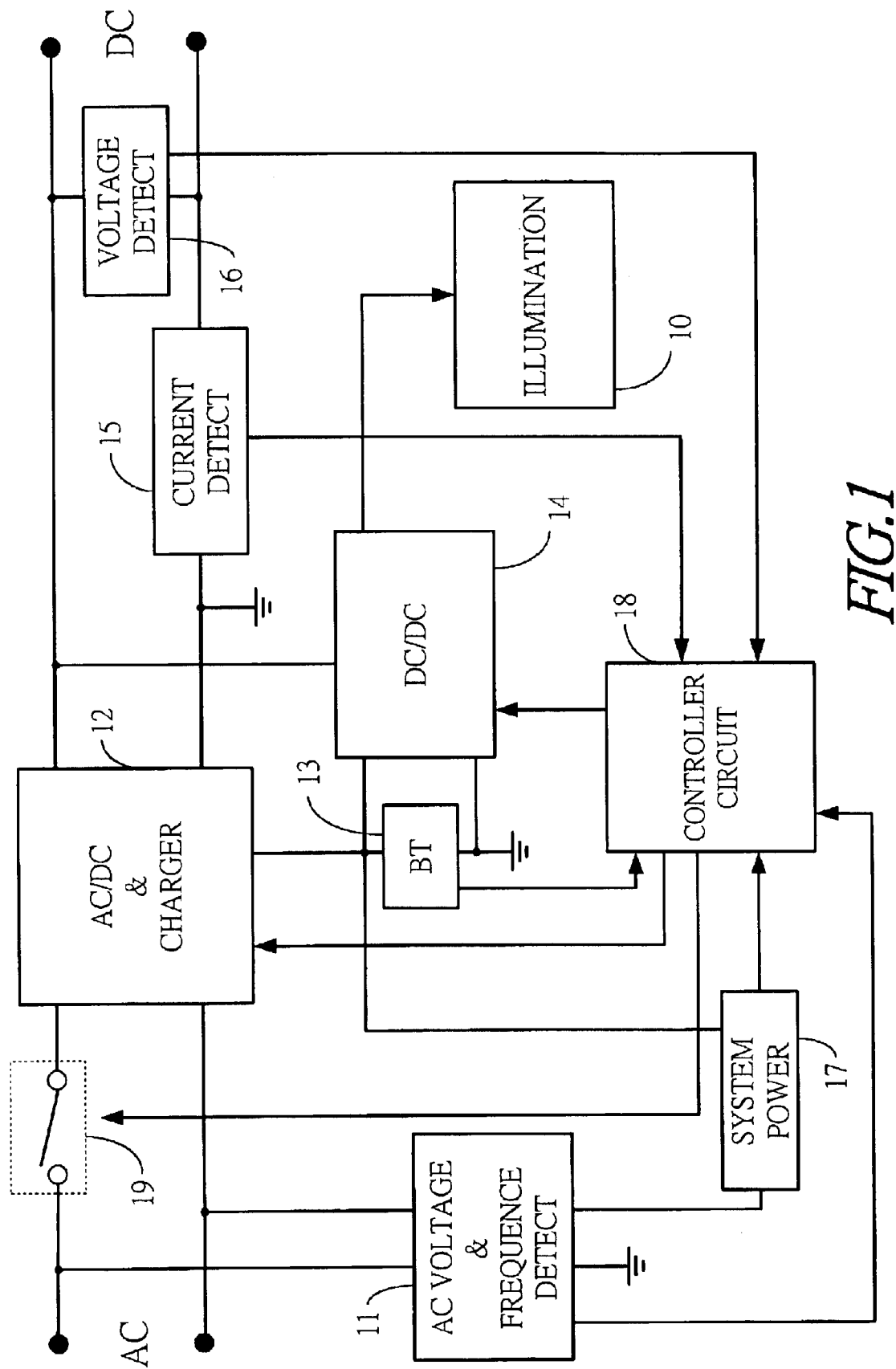
FIG. 1 is a layout scheme of the DC UPS in a first embodiment of the present invention.
Figure 3:
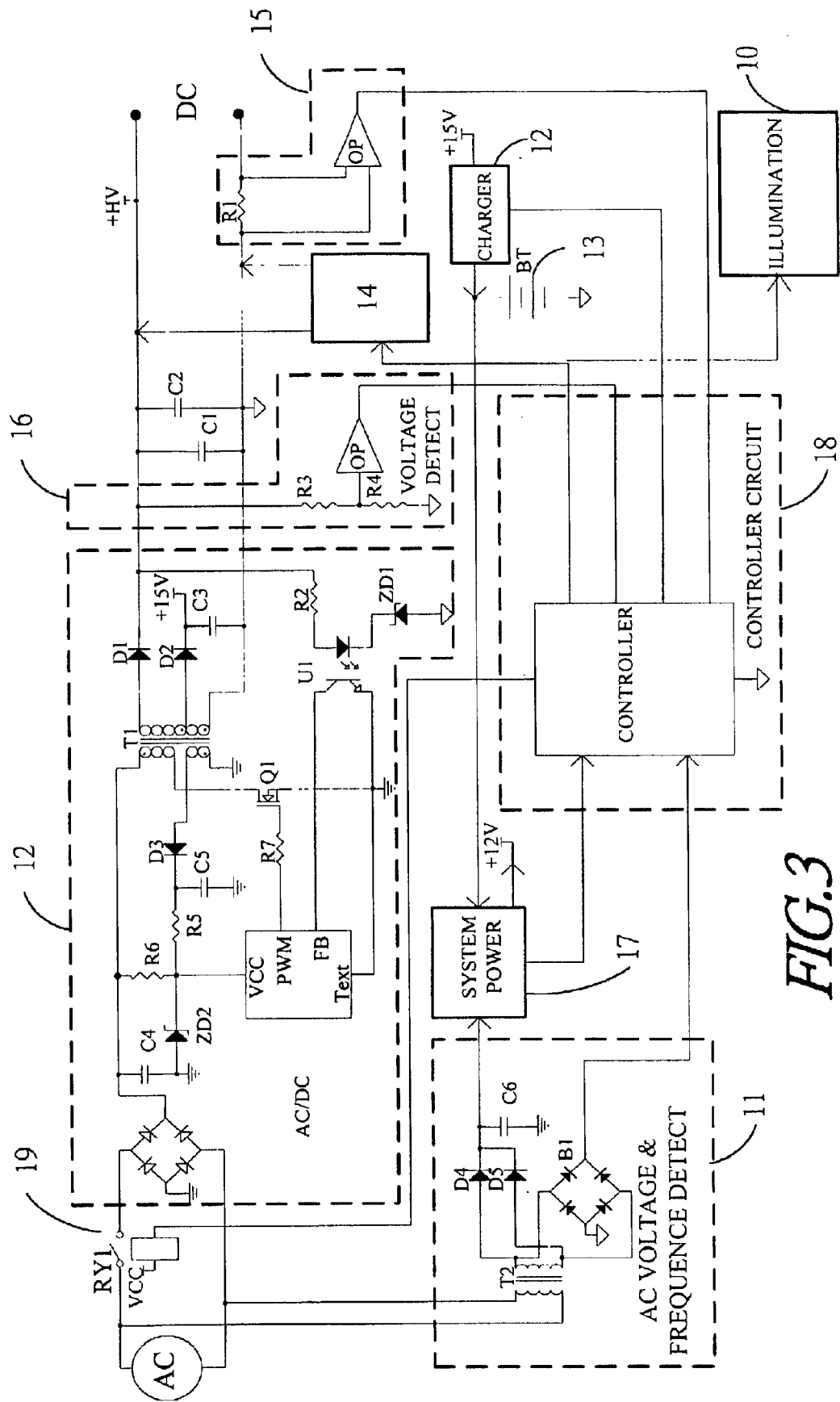
FIG. 3 is an electric circuit diagram of the DC UPS in a first embodiment of the present invention.

Referring to FIG. 1 and FIG. 3, in which a layout scheme (FIG. 1) and an electric circuit diagram (FIG. 3) of the DC USP in a first embodiment of the present invention are shown. This embodiment belongs to an ON-LINE system which essentially comprises a lighting equipment 10, an AC voltage and frequency detecting circuit 11, an AC to DC conversion and charging circuit 12, a battery unit 13, a DC voltage conversion circuit 14, a load detecting circuit 15, an output voltage detecting circuit 16, an inner system power source 17, a controller circuit 18, and a switch 19. So far there is an utility AC available, a signal is delivered to the controller circuit 18 from the AC voltage and frequency detecting circuit 11 to actuate the AC to DC conversion and charging circuit 12 and the switch 19 for outputting DC power and charging the battery unit 13.

After finishing charging the battery unit 13, a notification signal is sent to the controller circuit 18 for interrupting the charging circuit 12 so as to protect the battery unit 13. In case the voltage, or frequency etc. of the utility AC power is found to be abnormal, the controller circuit 18 is informed by the AC voltage and frequency detecting circuit 11 of this state so as to start operation of the DC voltage conversion circuit 14 for continuously supplying power to the loads thereby attaining the uninterrupted power supply, and turn on the lighting equipment 10 to illuminate surroundings.

The inner system power source 17 is for supplying power to the inner components of UPS. Besides, the controller circuit 18 can control the output voltage at a predetermined value according to the detected results obtained by the output voltage detecting circuit 16. And, the load detecting circuit 15 is for detecting whether there is an overloading at the output terminal and informing the controller circuit 18 of the detected results.

In the first embodiment, in addition to servicing for the electric appliances equipped with the SW power, a DC to AC inverter may be added to the present invention for supplying AC power to other appliances which have no attached SW power.

Figure 2:
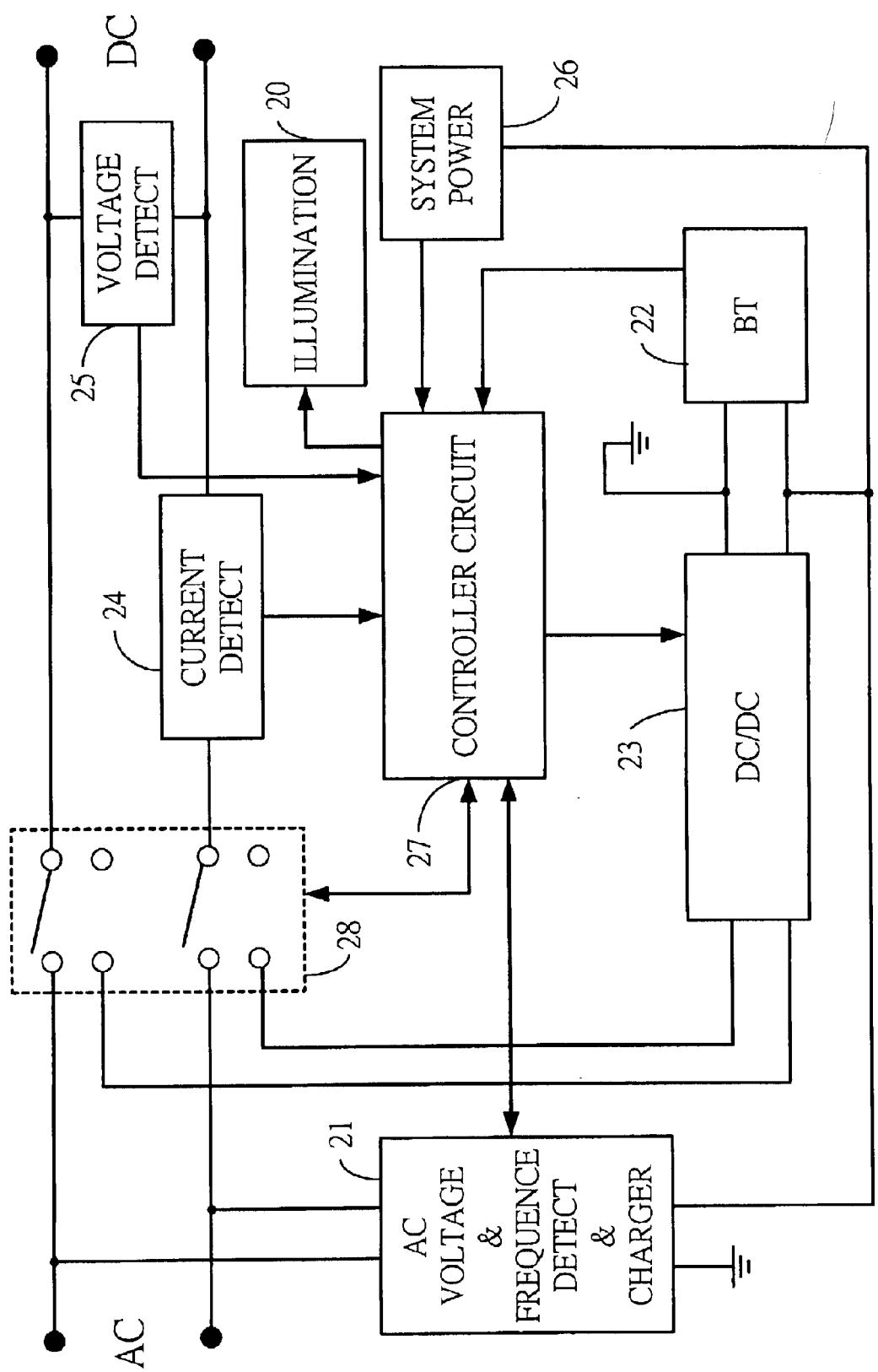
FIG. 2 is a layout scheme of the DC UPS in a second embodiment of the present invention.
Figure 4:
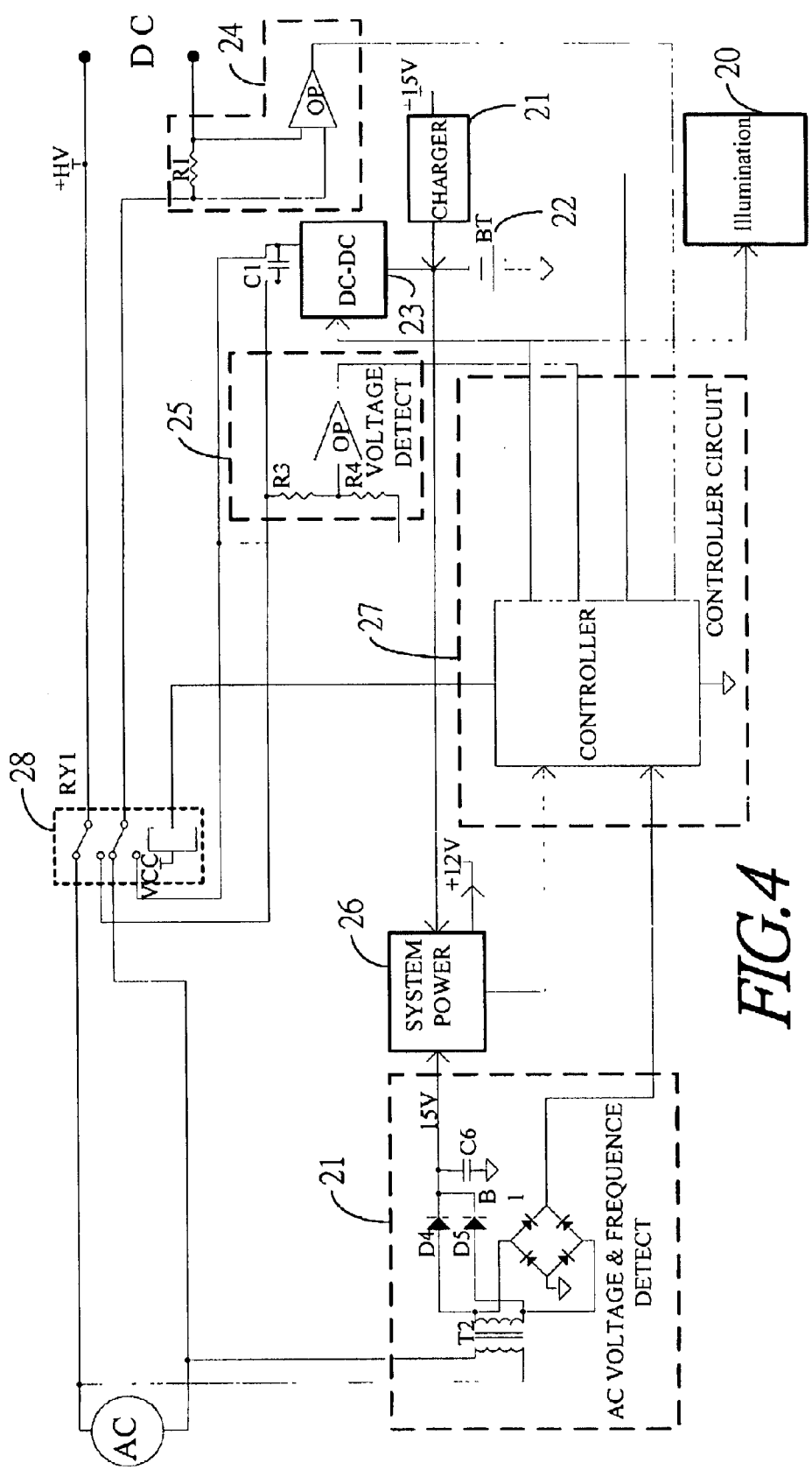
FIG. 4 is an electric circuit diagram of the DC IPS in a second embodiment of the present invention.

Referring to FIG. 2 and FIG. 4, in which a layout scheme (FIG. 2) and an electric circuit diagram (FIG. 4) of the UPS in a second embodiment of the present invention are shown. This embodiment belongs to an OFF-LINE system which essentially comprises a lighting equipment 20, an AC voltage and frequency detecting and charging circuit 21, a battery unit 22, a DC to AC convertion circuit 23, a load detecting circuit 24, and output voltage detecting circuit 25, an inner system power source 26, a controller circuit 27, and an electromagnetic switch 28. So far there is an utility AC input, the AC voltage and frequency detecting and charging circuit 21 delivers a signal to the battery unit 22 informing that it is to be charged and informing the controller circuit 27 for actuating the electromagnetic switch 28 to output an AC power.

When finished charging of the battery unit 22, a signal is sent to the controller circuit 27 to stop charging so as to protect the battery unit 22 from being overcharged. In case the voltage, or frequency etc. of the utility AC power is found to be abnormal, the controller circuit 27 is informed by the AC voltage and frequency detecting and charging circuit 21 of this state so as to start operation of the DC voltage conversion circuit 23 and the electromagnetic switch 28 continuously supplying power to the loads thereby attaining the aim of uninterrupted power supply.

The inner system power source 26 is for supplying power to the inner components of UPS. Besides, the controller circuit 27 can control the output voltage at a predetermined value according to the detected results obtained by the output voltage detecting circuit 25. And, the load detecting circuit 24 is for detecting whether there is an overloading at the output terminal and informing the controller circuit 27 of the detected results.

In the second embodiment, in addition to servicing for the appliances equipped with the SW power, a DC to AC inverter may be added to the present invention for supplying AC power to other appliances which have no attached SW power.

Figure 5:
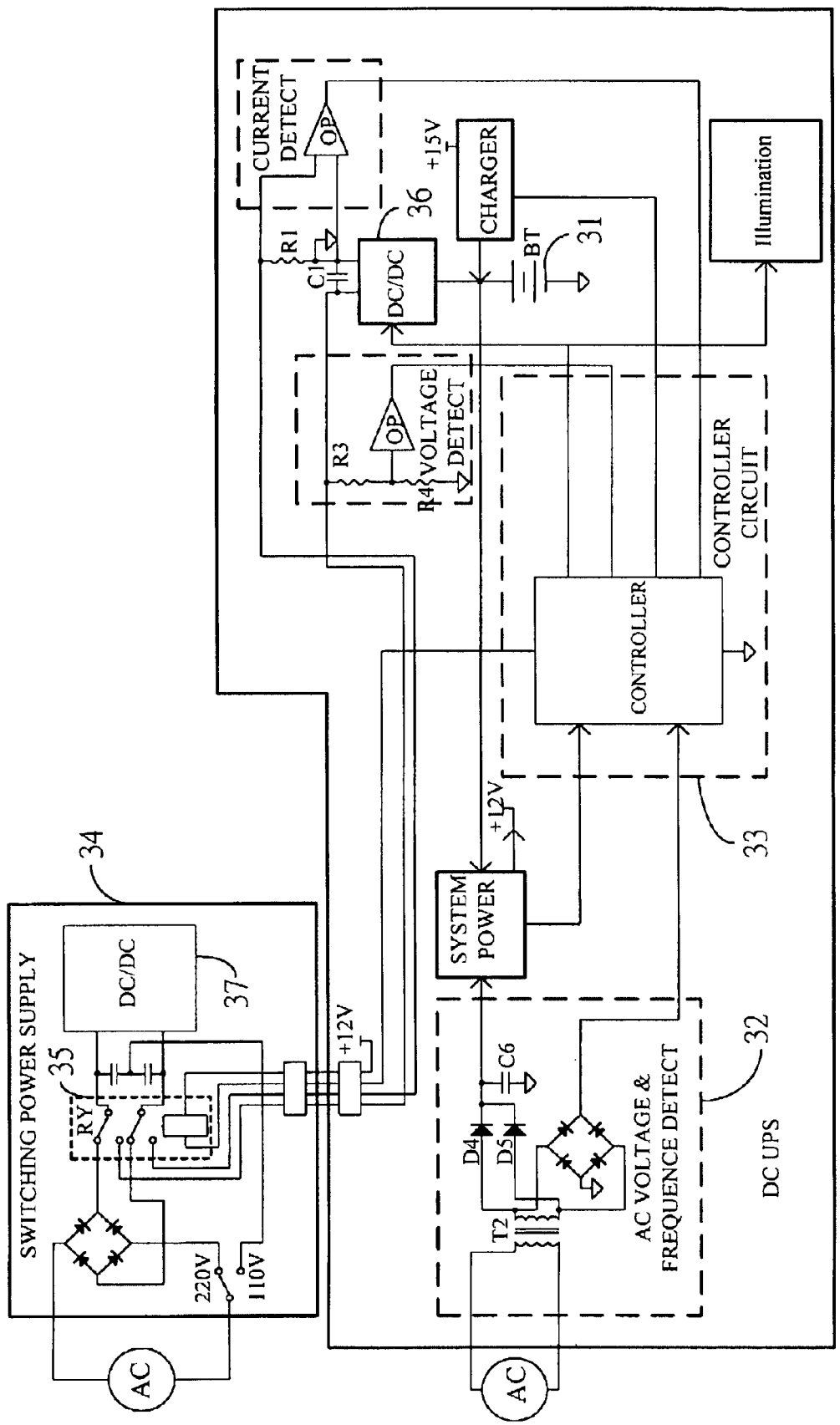
FIG. 5 is an illustrative diagram in which the DC UPS of the present invention is applied to an AC/DC switchable power supplier (SW power).

Referring to the illustrative diagram shown in FIG. 5 in which the UPS of the present invention is applied to an AC/DC switchable power supplier (SW power). If the utility AC power supply is working normally, the power is stored in a battery unit 31 after AC to DC conversion. In case the utility power fails to keep its normal state which being detected by a detecting circuit 32, a controller circuit 33 sends a signal to an electromagnetic switch 35 of a SW power 34 which actuates a DC voltage conversion circuit 36 to produce a high DC voltage. This high DC voltage is stepped down to a low voltage DC as an output power via another DC voltage conversion circuit 37.

It emerges from the description of the above embodiments that the invention has several noteworthy advantages which are not found in any conventional UPS, in particular;

1. The power loss in conversion is reduced which leads to energy saving and improving system efficiency.
2. The output voltage is not affected by variation of the input voltage so that the UPS of the present invention can always maintain a stable output voltage.
3. Power conversion is performed through only one stage so that the circuit scheme is simplified which also results in an environmental conscious effect.
4. In addition to taking over the mission of continuously supplying power to the loads, the UPS of the present invention is capable of turning on its lighting equipment so as to illuminate surroundings.

Only two preferred embodiments of the present invention are exemplified to shown its versatility and novelty, it is to be understood that the present invention is capable of use in various other combination and environments and is capable of changes or modification within the scope of inventive concept as expressed in appended claims.

What is claimed is:

1. Uninterruptible DC power system (DC UPS) well applicable as an emergency power source to electrical appliances attached with AC/DC switchable power suppliers (SW power) so as to reduce circuit loss due to power conversion, improve system efficiency, save energy, and maintain stable output voltage, comprising;

an inner system power source for supplying power to the inner components of said DC UPS;

an AC voltage and frequency detecting circuit for detecting utility AC voltage and frequency, and serving as the source for said inner system power source;

a battery unit;

an AC to DC conversion and charging circuit for converting the utility AC to DC, and charging said battery unit;

a load detecting circuit for detecting if there is overloading at the output terminal;

an output voltage detecting circuit for detecting the state of output voltage;

a switch;

a controller circuit for receiving signals from said AC voltage and frequency detecting circuit, said battery unit, said load detecting circuit, and said output voltage detecting circuit so as to control the state of said switch and said AC to DC conversion and charging circuit;

a DC voltage conversion circuit for stepping up the low DC output voltage of said battery unit to a high DC output voltage according to the signal from said controller circuit; and a lighting equipment operable with power from said DC voltage conversion circuit;

with this scheme, when there is a normal utility AC input, a signal is sent to said controller circuit from said AC voltage and frequency detecting circuit so as to start operation of said AC to DC conversion and charging circuit and said switch thereby charging said battery unit, as soon as said battery unit is fully charged, a signal is sent to said controller circuit to stop charging said battery unit thereby protecting said battery unit from overcharge; if the utility power is found to be abnormal, being informed by said AC voltage and frequency detecting circuit of such a state, said controller circuit indicates to start operation of said DC voltage conversion circuit so as to continuously supply power to the loads, and at the same time, turn on said lighting equipment.

2. The DC UPS of claim 1, wherein a DC to AC inverter is addable for supplying Ac power to other electric appliances.

3. Uninteruptible Dc power system (DC UPS) well applicable as an emergency power source to electrical appliances attached with AC/DC switchable power suppliers (SW power) so as to reduce circuit loss due to power conversion, improve system efficiency, save energy, and maintain stable output voltage, comprising;

an inner system power source for supplying power to the inner components of said DC UPS;

a battery unit;

an AC voltage and frequency detecting and charging circuit for detecting utility AC voltage and frequency, and supplying power to said inner system power source and charging current for charging said battery unit;

a load detecting circuit for detecting if there is overloading at the output terminal;

an output voltage detecting circuit for detecting the state of output voltage;

an electromagnetic switch;

a controller circuit for receiving signals from said AC voltage and frequency detecting and charging circuit, said battery unit, said load detecting circuit, and said output voltage detecting circuit so as to control the state of said electromagnetic switch and said AC voltage and frequency detecting and charging circuit;

a DC voltage conversion circuit for stepping up the low DC output voltage of said battery unit to a high DC output voltage according to the signal from said controller circuit; and a lighting equipment operable with power from said DC voltage conversion circuit;

with this scheme, when there is a normal utility AC input, a signal is sent by said AC voltage and frequency detecting and charging circuit to charge said battery unit and indicate said controller circuit to actuate said electromagnetic switch for outputting an AC power, as soon as the charging of said battery unit is completed, said controller circuit interrupts said charging circuit so as to protect the battery unit from overcharging; if the utility power is found to be abnormal, being informed by said AC voltage and frequency detecting and charging circuit of such a state, said controller circuit indicates to start operation of said DC voltage conversion circuit and change over said electromagnetic switch so as to continuously supply power to the loads, and turn on said lighting equipment.

4. The Dc UPS of claim 3, wherein a DC to AC inverter is addable for supplying AC power to other electric appliances.

* * * * *